(12) United States Patent
Koga et al.

(10) Patent No.: US 11,168,474 B2
(45) Date of Patent: Nov. 9, 2021

(54) SOUND INSULATION SHEET MEMBER AND SOUND INSULATION STRUCTURE USING SAME

(71) Applicant: Mitsubishi Chemical Corporation, Chiyoda-ku (JP)

(72) Inventors: Shogo Koga, Chiyoda-ku (JP); Shuichi Akasaka, Meguro-ku (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 609 days.

(21) Appl. No.: 16/053,278

(22) Filed: Aug. 2, 2018

(65) Prior Publication Data

US 2018/0340328 A1    Nov. 29, 2018

Related U.S. Application Data

(63) Continuation of application No. PCT/JP2017/003985, filed on Feb. 3, 2017.

(30) Foreign Application Priority Data

Feb. 4, 2016 (JP) .............................. JP2016-020049

(51) Int. Cl.
   *E04B 1/84* (2006.01)
   *G10K 11/162* (2006.01)
   (Continued)

(52) U.S. Cl.
   CPC .............. *E04B 1/8409* (2013.01); *B32B 3/00* (2013.01); *B32B 3/30* (2013.01); *B32B 25/04* (2013.01);
   (Continued)

(58) Field of Classification Search
   CPC .......... E04B 1/8409; E04B 1/941; E04B 1/86; E04B 2001/8428; E04B 2001/8419;
   (Continued)

(56) References Cited

U.S. PATENT DOCUMENTS 4,515,239 A * 5/1985 Blatt ...................... B32B 5/18
                                                181/290
5,400,296 A * 3/1995 Cushman ............. G10K 11/165
                                                181/284
(Continued)

FOREIGN PATENT DOCUMENTS

CN          104070740 A      10/2014
EP          2 871 638 A1      5/2015
(Continued)

OTHER PUBLICATIONS

International Search Report dated Apr. 11, 2017 in PCT/JP2017/003985, filed on Feb. 3, 2017.
(Continued)

*Primary Examiner* — Forrest M Phillips
(74) *Attorney, Agent, or Firm* — Oblon, McClelland, Maier & Neustadt, L.L.P.

(57) ABSTRACT

An object of the present invention is to provide a sound insulating sheet member that has high sound-insulating performance which exceeds mass law while being relatively light weight, that is highly flexible in design, excellent in versatility, and easy to manufacture so that productivity and economic efficiency can be improved, and a sound insulating structural body or the like using the same. The object thereof is achieved by using a sound insulating sheet member comprising at least a sheet having rubber elasticity and a plurality of resonant portions, wherein the resonant portions are provided in contact with a sheet surface of the sheet, each of the resonant portions including a base part and a weight part, and the weight part being supported by the base part and having a larger mass than the base part.

18 Claims, 21 Drawing Sheets

(51) Int. Cl.
 B32B 3/00 (2006.01)
 B32B 25/04 (2006.01)
 E04B 1/86 (2006.01)
 B32B 3/30 (2006.01)
 E04B 1/94 (2006.01)
 G10K 11/172 (2006.01)
 G10K 11/168 (2006.01)

(52) U.S. Cl.
 CPC ............... *E04B 1/86* (2013.01); *E04B 1/941* (2013.01); *G10K 11/162* (2013.01); *G10K 11/172* (2013.01); *B32B 2307/102* (2013.01); *B32B 2307/3065* (2013.01); *E04B 2001/8419* (2013.01); *E04B 2001/8428* (2013.01); *G10K 11/168* (2013.01)

(58) Field of Classification Search
 CPC ...... G10K 11/172; G10K 11/168; B32B 3/30; B32B 3/00; B32B 2307/1065; B32B 2307/102
 USPC .......................................................... 181/290
 See application file for complete search history.

(56) References Cited

U.S. PATENT DOCUMENTS

| | | | |
|---|---|---|---|
| 5,854,453 A | 12/1998 | Fujiwara et al. | |
| 7,249,653 B2* | 7/2007 | Sheng | E04B 1/86 181/207 |
| 7,263,028 B2* | 8/2007 | Thomas | B32B 5/16 181/284 |
| 7,837,008 B1* | 11/2010 | Lane | B64G 1/46 181/284 |
| 8,770,343 B2* | 7/2014 | Mathur | B64C 1/066 181/290 |
| 2003/0062217 A1* | 4/2003 | Sheng | E04B 1/86 181/290 |
| 2005/0194205 A1* | 9/2005 | Guo | G10K 11/16 181/210 |
| 2006/0131103 A1* | 6/2006 | Fuller | E04B 1/6801 181/290 |
| 2007/0020447 A1 | 1/2007 | Yamaguchi et al. | |
| 2009/0301810 A1* | 12/2009 | Gandhi | E04B 1/86 181/290 |
| 2014/0308492 A1 | 10/2014 | Albach et al. | |
| 2015/0015930 A1 | 1/2015 | Hussein et al. | |
| 2016/0186437 A1* | 6/2016 | Harrington | E04D 1/28 52/232 |

FOREIGN PATENT DOCUMENTS

| | | |
|---|---|---|
| JP | 6-43879 A | 2/1994 |
| JP | 2000-265593 | 9/2000 |
| WO | WO 96/11464 A1 | 4/1996 |
| WO | WO-2007127891 A2 * | 11/2007 ........... B29C 43/222 |

OTHER PUBLICATIONS

Assouar, M., et al. "Broadband plate-type acoustic metamaterial for low-frequency sound attenuation", Applied Physics Letters, vol. 101, pp. 173505-1-173505-4, 2012.
Oudich, M., et al. "Negative effective mass density of acoustic metamaterial plate decorated with low frequency resonant pillars", Journal of Applied Physics, vol. 116, pp. 184504-1-184504-7, 2014.
Oudich, M., et al. "A sonic band gap based on the locally resonant phononic plates with stubs", New Journal of Physics, vol. 12, 11 pages, 2010.
Liu, Z., et al. "Locally Resonant Sonic Materials", Science, vol. 289, pp. 1734-1736, 2000.
Japanese Office Action dated Jul. 9, 2019 in Japanese Patent Application No. 2017-565647 (with unedited computer generated English translation), 10 pages.
English translation of the International Preliminary Report on Patentability and Written Opinion dated Aug. 16, 2018 in PCT/JP2017/003985.
Combined Taiwanese Office Action and Search Report dated Sep. 3, 2020 in Patent Application No. 106103745 (with English machine translation), 17 pages.
Extended European Search Report dated Feb. 1, 2019 in Patent Application No. 17747560.5, 8 pages.
Assouar, M.B. et al. "Enlargement of a locally resonant sonic band gap by using double-sides stubbed phononic plates" Applied Physics Letters, vol. 100, No. 12, XP055545412, 2012, pp. 123506-1 to 123506-4.
Japanese Office Action dated Apr. 6, 2021 in Japanese Patent Application No. 2019-198146 (with English translation), 5 pages.
Extended European Search Report dated Aug. 5, 2021, in corresponding European Patent Application No. 21179005.0.

* cited by examiner

SOUND INSULATION SHEET MEMBER AND SOUND INSULATION STRUCTURE USING SAME

CROSS-REFERENCE TO RELATED APPLICATION

This is a continuation of International Application No. PCT/JP2017/003985, filed on Feb. 3, 2017, and designated the U.S., and claims priority from Japanese Patent Application No. 2016-020049 which was filed on Feb. 4, 2016, the entire contents of which are incorporated herein by reference.

TECHNICAL FIELD

The present invention relates to a sound insulating sheet member and a sound insulating structural body using the same.

BACKGROUND ART

Buildings such as apartments, office buildings, and hotels, require insulation from outdoor noise such as automobiles, trains, airplanes, ships, and the like and equipment noise and human voice that occur in the buildings to keep quietness suitable for room use. Additionally, in vehicles such as automobiles, trains, airplanes, and ships, it is necessary to insulate wind noise and engine noise to reduce indoor noise so that passengers are provided with a quiet and comfortable space. To this end, research and development have been made to explore means for blocking propagation of noise and vibration from outdoor to indoor or from outside to inside the vehicles, i.e., vibration damping and sound insulating means. Recently, buildings have required light-weight vibration damping and sound insulating members due to high-rise building construction and the like, and vehicles also have required light-weight vibration damping and sound insulating members for improving energy efficiency. Furthermore, in order to improve design flexibility of buildings, vehicles, and equipment thereof, there has been a desire for a vibration damping and sound insulating member adaptable to intricate shapes.

In general, properties of a vibration damping and sound insulating material follow the so-called mass law. In other words, transmission loss, which is an index of the amount of reduced noise, is determined by a logarithm of a product of the mass of the vibration damping and sound insulating material multiplied by the frequency of an acoustic wave or a sound wave. Accordingly, in order to increase reduction of a noise having a certain constant frequency, the mass of the vibration damping and sound insulating material needs to be increased. However, increasing the mass of the vibration damping and sound insulating material limits the amount of noise reduction due to restrictions to the masses of buildings, vehicles, and the like.

To solve the problem of increase in the mass of a vibration damping and sound insulating member, improvement of member structure has conventionally been made. Examples of known methods include combined use of a plurality of rigid flat plate materials, such as gypsum boards, concrete, steel plates, glass plates, or resin plates and use of a hollow double-wall structure or a hollow triple-wall structure using a gypsum board or the like.

And in recent years, in order to achieve such sound insulating performance that exceeds mass law, sound insulating plates made of a plate-type acoustic metamaterial have been proposed in which a highly rigid flat plate material and resonators are used in combination. Specifically, there have been proposed sound insulating plates provided with a plurality of independent stubby projections (resonators) made of silicone rubber and tungsten or a plurality of independent stubby projections (resonators) made of rubber on an aluminum substrate (see Non-Patent Literature 1 and 2) and a sound insulating plate provided with a plurality of independent stubby projections (resonators) made of silicone rubber or silicone rubber and a lead cap on an epoxy substrate ((see Non-Patent Literature 3).

CITATION LIST

Non-Patent Literature

Non-Patent Literature 1: M. B. Assouar, M. Senesi, M. Oudich, M. Ruzzene and Z. Hou, Broadband plate-type acoustic metamaterial for low-frequency sound attenuation, Applied Physics Letters, 2012, volume 101, pp 173505.

Non-Patent Literature 2: M. Oudich, B. Djafari-Rouhani, Y. Pennec, M. B. Assouar, and B. Bonello, Negative effective mass density of acoustic metamaterial plate decorated with low frequency resonant pillars, Journal of Applied Physics, 2014, volume 116, pp 184504.

Non-Patent Literature 3: M. Oudich, Y. Li, M. B. Assouar, and Z. Hou, A sonic band gap based on the locally resonant phononic plates with stubs, New Journal of Physics, 2010, volume 12, pp 083049.

SUMMARY OF INVENTION

Technical Problem

Non-Patent Literature 1 to 3 have considered sound insulating performance in changing the material and size of the stubby projections (resonators). However, when improving sound insulating performance by merely changing the material and size of the stubby projections (resonators), design flexibility has been limited.

In addition, the sound insulating plates disclosed in Non-Patent Literature 1 to 3, which had the individual resonators arranged on the substrate by using an adhesive, were complicated in manufacturing process, and thus inferior in productivity and economic efficiency. Moreover, the sound insulating plates disclosed in Non-Patent Literature 1 to 3 use the relatively rigid aluminum substrate or epoxy substrate, and thus cannot easily be deformed. Accordingly, for example, the sound insulating plates cannot be arranged along a non-flat surface such as a curved surface.

As a solution to the problem, it is considerable that an aluminum substrate or epoxy substrate curvedly molded in advance is employed to provide a plurality of resonators on the curved surfaces of the substrates. However, in this structure, the individual resonators need to be arranged on the curved surface, so that the manufacturing process becomes more difficult, which further deteriorates productivity and economic efficiency. In addition, preparing every time a substrate corresponding to the curved shape of an arrangement place lacks versatility. Therefore, for enlargement of industrial applicability, a sound insulating sheet member based on anew design concept has been desired, particularly from the viewpoints of design flexibility, versatility, productivity, cost, and the like.

The present invention has been made in view of the above background art. It is an object of the present invention to provide a sound insulating sheet member that has high sound-insulating performance which exceeds the mass law while being relatively light weight, that is highly flexible in design, excellent in versatility, and easy to manufacture so that productivity and economic efficiency can be improved, and a sound insulating structural body using the same.

It is to be noted that the present invention is not limited to the object mentioned above, and another object of the invention can be to achieve functions and effects that are obtained from respective arrangements illustrated in embodiments of the invention described below, and that are not obtained by the conventional techniques.

Solution to Problem

The present inventors conducted intensive and extensive studies to solve the above problems. As a result, the present inventors found out that the problems can be solved by employing a sheet member including a sheet having rubber elasticity and a plurality of resonant portions provided on the sheet, and completed the present invention.

Specifically, the present invention provides the following various specific aspects:

[1] A sound insulating sheet member including at least a sheet having rubber elasticity and a plurality of resonant portions, in which the resonant portions are provided in contact with a sheet surface of the sheet, each of the resonant portions including a base part and a weight part, and the weight part being supported by the base part and having a larger mass than the base part.

[2] The sound insulating sheet member according to the [1], in which the sheet includes at least one selected from a group consisting of thermosetting or photocurable elastomers and thermoplastic elastomers.

[3] The sound insulating sheet member according to the [1] or [2], in which the sheet has a Young's modulus of from 0.01 MPa to 100 MPa.

[4] The sound insulating sheet member according to any of the [1] to [3], in which the base part includes at least one selected from a group consisting of thermosetting or photocurable elastomers, thermoplastic elastomers, thermosetting or photocurable resins, and thermoplastic resins.

[5] The sound insulating sheet member according to any of the [1] to [4], in which the sheet and the resonant portions are an integrally molded article, and both together include at least one selected from the group consisting of thermosetting or photocurable elastomers and thermoplastic elastomers.

[6] The sound insulating sheet member according to any of the [1] to [5], in which the weight part includes at least one selected from a group consisting of metals, alloys, and inorganic glasses.

[7] The sound insulating sheet member according to any of the [1] to [6], in which at least a part of the weight part is embedded in the base part.

[8] The sound insulating sheet member according to any of the [1] to [7], in which the weight part includes a protruding part provided toward the base part.

[9] The sound insulating sheet member according to any of the [1] to [8], further including at least one or more rib-like projecting portions, in which the rib-like projecting portions are provided in contact with the sheet surface of the sheet, and have a height higher than the resonant portions in a sheet normal direction.

[10] The sound insulating sheet member according to the [9], in which the rib-like projecting portions are provided so as to extend in a sheet length direction of the sheet.

[11] The sound insulating sheet member according to the [9] or [10], in which a plurality of the rib-like projecting portions are spaced apart along the sheet length direction of the sheet.

[12] The sound insulating sheet member according to any of the [9] to [11], in which the sheet, the resonant portions, and the rib-like projecting portions are an integrally molded article, and all together include at least one selected from the group consisting of thermosetting or photocurable elastomers and thermoplastic elastomers.

[13] A sound insulating structural body including at least the sound insulating sheet member according to any of the [1] to [12] and a support body, in which the support body is provided in contact with at least one surface of the sheet of the sound insulating sheet member, and supports the sheet.

[14] The sound insulating structural body according to the [13], in which the support body has a Young's modulus of 1 GPa or more.

[15] A sound insulating structural body including the sound insulating sheet member according to any of the [1] to [12] and a flame retardant and/or nonflammable member.

[16] A sound insulating structural body that is a layered body including the sound insulating sheet member according to any of the [1] to [12].

[17] A method for manufacturing a sound insulating sheet member, including the following steps of:

(1) preparing a mold provided with a plurality of cavities and arranging a weight in each of the plurality of cavities provided in the mold;

(2) pouring a resin material and/or polymer material in the cavities, (3) curing the poured resin material and/or polymer material; and (4) releasing the resulting cured article from the mold.

[18] The method for manufacturing a sound insulating sheet member according to the [17], in which bottoms of the cavities are hemispherical.

Advantageous Effects of Invention

The present invention can provide a sound insulating sheet member that has high sound-insulating performance which exceeds mass low while being relatively light weight, that is highly flexible in design, excellent in versatility, and easy to manufacture so that productivity and economic efficiency can be improved, and a sound insulating structural body using the same.

MODE FOR CARRYING OUT THE INVENTION

Figure 1:
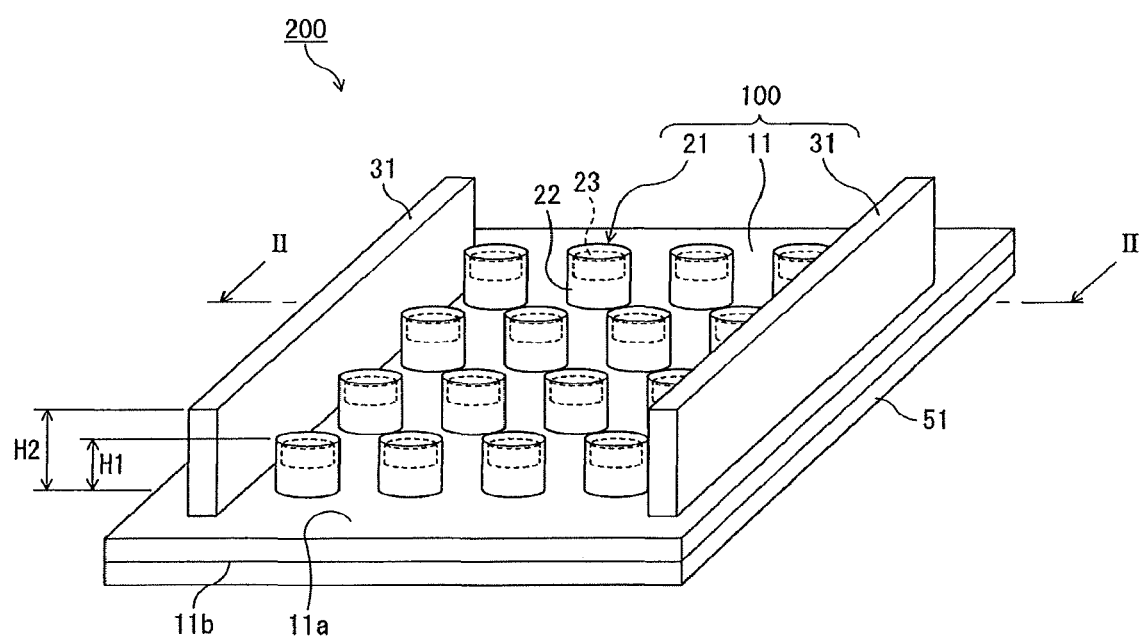
FIG. 1 is a schematic perspective view illustrating a sound insulating sheet member and a sound insulating structural body according to a first embodiment.

A sound insulating sheet member according to the present invention includes at least a sheet having rubber elasticity and a plurality of resonant portions, in which the resonant portions are provided in contact with a sheet surface of the sheet, each of the resonant portions including a base part and a weight part, and the weight part being supported by the base part and having a larger mass than the base part.

Hereinafter, each embodiment of the present invention will be described with reference to the drawings. It should be noted that each embodiment below is merely exemplary to illustrate the present invention, and the present invention is not limited to only the embodiments. In addition, hereinbelow, it should be noted that positional relationships such as vertical and lateral relationships are based on those illustrated in the drawings unless otherwise specified. Additionally, dimensional scales for the drawings are not limited to those illustrated in the drawings. Note that, in the present specification, the representation of a numerical range of, for example, "from 1 to 100" encompasses both of the lower limit value "1" and the upper limit value "100". This also applies to representations of other numerical ranges.

First Embodiment

Figure 2:
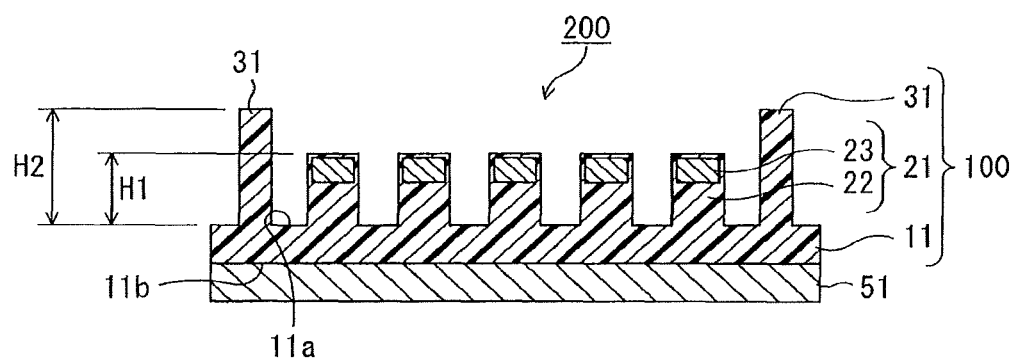
FIG. 2 is a cross-sectional view taken along arrows II-II of FIG. 1.
Figure 3:
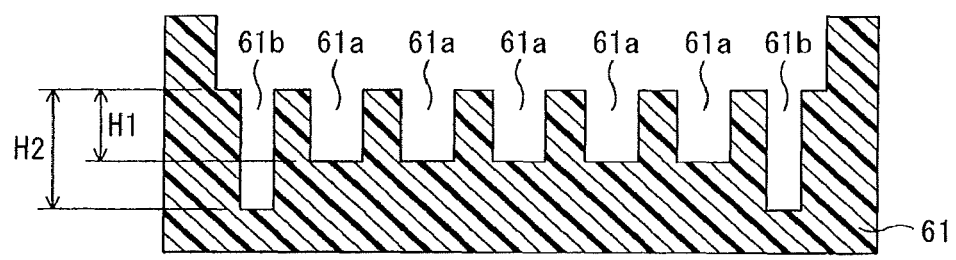
FIG. 3 is a diagram illustrating an example of a step in manufacturing the sound insulating sheet member.
Figure 4:
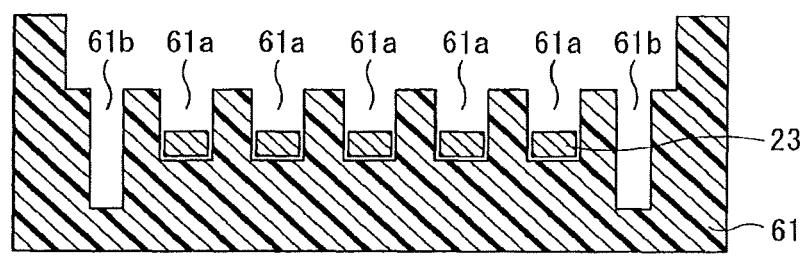
FIG. 4 is a diagram illustrating an example of a step in manufacturing the sound insulating sheet member.
Figure 5:
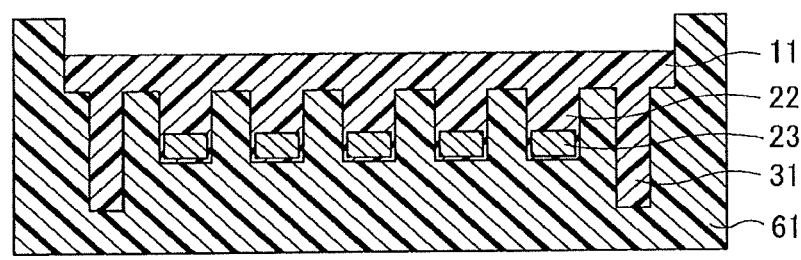
FIG. 5 is a diagram illustrating an example of a step in manufacturing the sound insulating sheet member.
Figure 6:
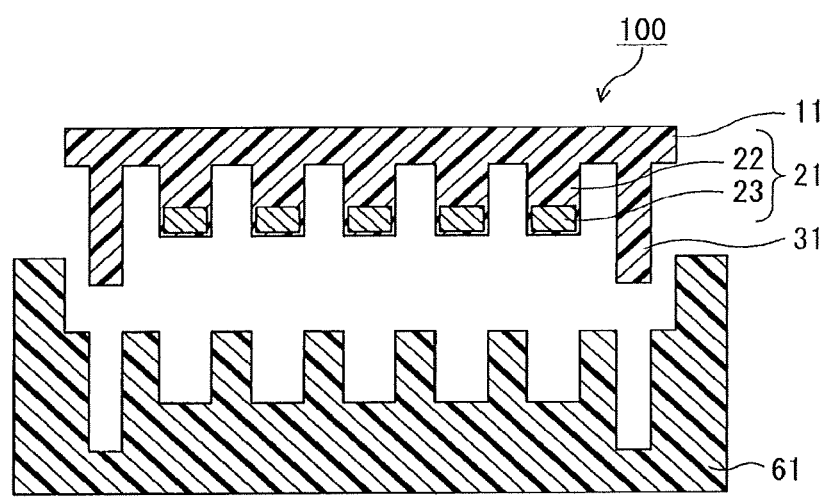
FIG. 6 is a diagram illustrating an example of a step in manufacturing the sound insulating sheet member.

FIG. 1 and FIG. 2 are a schematic perspective view illustrating a sound insulating sheet member 100 and a sound insulating structural body 200 of the present embodiment and a cross-sectional view taken along arrows II-II thereof. The sound insulating sheet member 100 includes a sheet 11 having rubber elasticity, a plurality of resonant portions 21 provided in contact with a sheet surface 11a of the sheet 11, and at least one or more rib-like projecting portions 31 provided on the sheet surface 11a. The sound insulating sheet member 100 is supported by a support body 51 provided on a sheet surface 11b side of the sheet 11, whereby the sound insulating structural body 200 is formed.

In the sound insulating sheet member 100 and the sound insulating structural body 200, for example, when a sound wave is input from a noise source located on the support body 51 side, resonance of the sheet 11 and/or the resonant portions 21 occurs. In this case, there can exist a frequency region in which the direction of a force acting on the support body 51 is opposite to the direction of an acceleration occurring at the sheet 11 and/or the resonant portions 21. Thus, apart or all of the vibration having a specific frequency is cancelled out, which creates a complete acoustic band gap where the vibration having a specific frequency is almost completely gone. Due to this, the part or all of the vibration comes to rest in the vicinity of a resonance frequency of the sheet 11 and/or the resonant portions 21, as a result of which high sound-insulating performance that exceeds mass law can be obtained. A sound-insulating member using such as a principle is called an acoustic metamaterial. Hereinafter, respective constituent elements of the sound insulating sheet member 100 and the sound insulating structural body 200 of the present embodiment will be described in detail.

Sheet

The sheet 11 is a sheet having rubber elasticity. Although not particularly limited, the sheet 11 may have rubber elasticity due to molecular motion of a resin (an organic polymer) or the like. The sheet 11 is capable of functioning as a vibrator (a resonator) that vibrates at a certain frequency when a sound wave is input from a noise source.

As a material forming the sheet 11, the sheet 11 preferably includes at least one selected from a group consisting of thermosetting or photocurable elastomers and thermoplastic elastomers. Thermosetting elastomers or thermoplastic elastomers are more preferably used, because irradiated light may hardly reach the center part as the thickness of the sheet 11 is larger.

Specific examples of the material include thermosetting elastomers, including vulcanized rubbers such as chemically cross-linked natural rubber or synthetic rubber and thermosetting resin-based elastomers such as urethane rubber, silicone rubber, fluorine rubber, and acrylic rubber; thermoplastic elastomers, including olefin-based thermoplastic elastomers, styrene-based thermoplastic elastomers, vinyl chloride-based thermoplastic elastomers, urethane-based thermoplastic elastomers, ester-based thermoplastic elastomers, amide-based thermoplastic elastomers, silicone rubber-based thermoplastic elastomers, and acrylic thermoplastic elastomers; and photocurable elastomers, including acrylic photocurable elastomers, silicone-based photocurable elastomers, and epoxy-based photocurable elastomers. More specifically, there may be mentioned natural rubber, isoprene rubber, butadiene rubber, styrene-butadiene rubber, chloroprene rubber, nitrile rubber, polyisobutylene rubber, ethylene-propylene rubber, chlorosulfonated polyethylene rubber, acrylic rubber, fluorine rubber, epichlorohydrin rubber, polyester rubber, urethane rubber, silicone rubber, modified products thereof, and the like, although not particularly limited thereto. These materials can be used singly or in combination of two or more thereof. Among them, preferred are natural rubber, isoprene rubber, butadiene rubber, styrene-butadiene rubber, chloroprene rubber, nitrile rubber, polyisobutylene rubber, ethylene-propylene rubber, chlorosulfonated polyethylene rubber, acrylic rubber, fluorine rubber, epichlorohydrin rubber, polyester rubber, urethane rubber, silicone rubber, and modified products thereof, and more preferred are silicone rubber, acrylic rubber, and modified products thereof from the viewpoints of excellent heat resistance, excellent cold resistance, and the like.

The sheet 11 may include various kinds of additives, such as a flame retardant, an antioxidant, and a plasticizer, as long as it is a sheet exhibiting the so-called rubber elasticity. Flame retardants are additives that are added to prevent flammable materials from easily burning or igniting. Specific examples thereof include bromine compounds such as pentabromodiphenyl ether, octabromodiphenyl ether, decabromodiphenyl ether, tetrabromobisphenol A, hexabromo cyclododecane, and hexabromobenzene, phosphorus compounds such as triphenyl phosphate, chlorine compounds such as chlorinated paraffins, antimony compounds such as antimony trioxide, metal hydroxides such as aluminum hydroxide, nitrogen compounds such as melamine cyanurate, and boron compounds such as sodium borate, although not particularly limited thereto. Additionally, antioxidants are additives that are added to prevent oxidative degradation. Specific examples thereof include phenolic antioxidants, sulfur antioxidants, and phosphorus antioxidants, although not particularly limited thereto. Furthermore, plasticizers are additives that are added to improve flexibility and weather resistance. Specific examples thereof include phthalic acid ester, adipic acid ester, trimellitic acid ester, polyester, phosphoric acid ester, citric acid ester, sebacic acid ester, azelaic acid ester, maleic acid ester, silicone oil, mineral oil, vegetable oil, and modified products thereof, although not particularly limited thereto. These can be used singly or in combination of two or more thereof.

In the present embodiment, the sheet 11 is formed into a square shape in plan view, but the shape thereof is not particularly limited thereto. Any plan view shape can be employed, such as any of polygonal shapes including triangular, oblong, rectangular, trapezoidal, rhombic, pentagonal, and hexagonal shapes, circular shapes, elliptical shapes, and irregular shapes that are not classified into these shapes. Note that the sheet 11 may have a cutout portion, a punched-out hole, or the like at anyplace as long as properties of the acoustic metamaterial are not impaired, from the viewpoints of improvement of stretchability, weight reduction, and the like.

The thickness of the sheet 11 is not particularly limited. The thickness of the sheet 11 also enables control of a frequency band where high sound-insulating performance is exhibited (an acoustic band gap width and a frequency position). Thus, the thickness of the sheet 11 can be set as appropriate so that the acoustic band gap is coincident with a desired sound insulation frequency region. When the thickness of the sheet 11 is large, the acoustic band gap width is narrowed, and tends to shift to a low frequency side. Alternatively, when the sheet 11 has a small thickness, the acoustic band gap width is widened, and tends to shift to a high frequency side. From the viewpoints of sound-insulating performance, mechanical strength, flexibility, handleability, and the like, the thickness of the sheet 11 is preferably 50 μm or more, more preferably 100 μm or more, and still more preferably 200 μm or more. Additionally, the thickness of the sheet 11 is preferably 10 mm or less, more preferably 1 mm or less, and still more preferably 500 μm or less.

Herein, from the viewpoints of sound-insulating performance, mechanical strength, flexibility, handleability, productivity, and the like, the sheet 11 has a Young's modulus of preferably 0.01 MPa or more, and more preferably 0.1 MPa or more, and has a Young's modulus of preferably 100 MPa or less, and more preferably of 10 MPa or less. As used herein, the term Young's modulus in the present specification means a ratio of a force (stress) acting on per unit cross-sectional area of a specimen and a deformation rate (strain) when an external force is applied in a uniaxial direction, and means a value of a storage normal modulus at 25° C. and 10 Hz, measured by a forced oscillation non-resonance method in JIS K 6394: 2007 "Rubber, vulcanized or thermoplastic—Determination of dynamic properties—".

Additionally, from the viewpoint of reduction of temperature dependence of sound-insulating performance at low temperature, the sheet 11 has a glass transition temperature of preferably 0° C. or less. The lower the glass transition temperature of the sheet 11, the higher the cold resistance. Thus, the temperature dependence of Young's modulus in the vicinity of 0° C. becomes small, and sound-insulating performance tends to hardly depend on environmental temperature. The glass transition temperature is more preferably −10° C. or less, still more preferably −20° C. or less, and particularly preferably −30° C. or less. Note that, in the present specification, the glass transition temperature of the sheet 11 means a peak temperature of a tangent of the loss angle in dynamic viscoelasticity measurement at the frequency of 10 Hz described above, particularly, temperature dependence measurement.

Resonant Portion

The resonant portions 21 function as vibrators (resonators) that vibrate at a certain frequency when a sound wave is input from a noise source. The resonant portions 21 of the present embodiment each are formed by a composite structural body including a base part 22 and a weight part 23 that is supported by the base part 22 and that has a larger mass than the base part 22. Each of the resonant portions 21, which has such a composite structural body, functions effectively as a resonator having a resonance frequency that is determined by the mass of the weight part 23 working as a weight and the spring constant of the base part 22 working as a spring.

The array of the resonant portions 21, the number thereof to be arranged, the size thereof, and the like can be determined as appropriate according to desired performance, and are not particularly limited. The resonant portions 21 are provided in contact with at least one sheet surface of the sheet. For example, in the present embodiment, the plurality of resonant portions 21 are arranged at an equal interval in a matrix form, although the array of the resonant portions 21 is not particularly limited thereto. For example, the plurality of the resonant portions 21 may be arranged in a staggered manner or at random. The sound-insulating mechanism by the sheet does not use Bragg scattering, as in the so-called phononic crystals, and therefore the resonant portions 21 do not necessarily have to be arranged at a regular and periodic interval.

In addition, the number of the resonant portions 21 to be arranged per unit area is not particularly limited as long as the resonant portions 21 can be arranged so as to prevent mutual interference due to contact therebetween or other reason. The maximum number of the resonant portions 21 per unit area varies depending on the shape and the like of the resonant portions 21. For example, when the resonant portions 21 have a cylindrical shape whose height direction is disposed in parallel to a sheet normal direction and whose cylindrical cross-sectional diameter is 1 cm, 100 pieces or less per 10 cm$^2$ are preferable. Additionally, regarding the minimum number of the resonant portions 21 per unit area, for example, when the resonant portions 21 have a cylindrical shape whose height direction is disposed in parallel to the sheet normal direction and whose cross-sectional diameter is 1 cm, 2 pieces or more per 10 cm² are preferable, 10 pieces or more per 10 cm² are more preferable, and 50 pieces or more per 10 cm² are still more preferable. By arranging such that the number of the resonant portions 21 falls within the above preferable lower limit or more, higher sound-insulating performance tends to be obtainable. In addition, arranging such that the number of the resonant portions 21 falls within the above preferable upper limit or less facilitates achievement of weight reduction of the entire sheet.

A maximum height H1 of the resonant portions 21 in the normal direction of the sheet 11 can be set as appropriate according to desired performance, and is not particularly limited. From the viewpoints of molding easiness, productivity improvement, and the like, the maximum height H1 is preferably from 50 μm to 100 mm, more preferably from 100 μm to 50 mm, and still more preferably from 1 mm to 20 mm. Setting the maximum height H1 within the above preferable numerical range facilitates winding and stacking of the sheet 11 (i.e., the sound insulating sheet member 100) provided with the resonant portions 21 thereon, thereby enabling manufacturing and storage thereof in the so-called roll-to-roll manner, so that productivity and economic efficiency tend to be improved.

Base Part

In the present embodiment, a plurality of base parts 22 having a substantially cylindrical outer shape are provided in contact with a sheet surface 11a of the sheet 11. Inside the base parts 22 are embedded each weight part 23 having a substantially cylindrical outer shape. The outer shape of the base parts 22 is not particularly limited, and any shape can be employed, such as any of polygonal prism-like shapes including a triangular prism-like shape, a rectangular prism-like shape, a trapezoidal prism-like shape, a pentagonal prism-like shape, and a hexagonal prism-like shape, cylindrical shapes, elliptic cylindrical shapes, truncated pyramid shapes, truncated cone shapes, pyramid shapes, cone shapes, hollow tubular shapes, branched shapes, and irregular shapes that are not classified into these shapes. In addition, the base parts 22 can be formed into a columnar shape having a cross-sectional area and/or cross-sectional shape varying depending on the height position of the base parts 22.

The material of the base parts 22 is not particularly limited as long as the material satisfies the above-mentioned required characteristics. Examples of the material include polymer materials, in which there may be mentioned at least one selected from a group consisting of thermosetting or photocurable elastomers, thermoplastic elastomers, thermosetting or photocurable resins, and thermoplastic resins.

Examples of the thermosetting or photocurable elastomers and thermoplastic elastomers include those exemplified for the sheet. Examples of the thermosetting or photocurable resins include acrylic thermosetting resins, urethane-based thermosetting resins, silicone-based thermosetting resins, and epoxy-based thermosetting resins. Examples of the thermoplastic resins include polyolefin-based thermoplastic resins, polyester-based thermoplastic resins, acrylic thermoplastic resins, urethane-based thermoplastic resins, and polycarbonate-based thermoplastic resins.

Specific examples thereof include rubbers, including vulcanized rubbers such as chemically cross-linked natural rubber or synthetic rubber, isoprene rubber, butadiene rubber, styrene-butadiene rubber, chloroprene rubber, nitrile rubber, polyisobutylene rubber, ethylene propylene rubber, chlorosulfonated polyethylene rubber, acrylic rubber, fluorine rubber, epichlorohydrin rubber, polyester rubber, urethane rubber, silicone rubber, and modified products thereof; and polymers such as polyacrylonitrile, polyethylene terephthalate, polybutylene terephthalate, polyvinyl chloride, polychlorotrifluoroethylene, polyethylene, polypropylene, polynorbornene, polyether ether ketone, polyphenylene sulfide, polyarylate, polycarbonate, polystyrene, epoxy resin, and oxazine resin, although not particularly limited thereto. These can be used singly or in combination of two or more thereof. Additionally, the base parts 22 may be composed of a porous body including pores (a gas such as air) in any of these polymer materials. Furthermore, the base parts 22 may include a liquid material such as mineral oil, vegetable oil, or silicone oil. Note that, when the base parts 22 include a liquid material, the liquid material is desirably sealed in a polymer material from the viewpoint of prevention of outward leakage of the liquid material.

Among these, the material of the base parts 22 is preferably the same material as that of the aforementioned sheet 11, and particularly preferred are elastomers. The sheet 11 and the base parts 22 including the same elastomer can be easily integrally molded together, so that productivity can be significantly increased. In other words, in one of particularly preferable embodiments, the sheet 11 and the resonant portions 21 (the base parts 22) are an integrally molded article in which the sheet 11 and the resonant portions 21 (the base parts 22) both together include at least one selected from the group consisting of thermosetting or photocurable elastomers and thermoplastic elastomers. Specific examples of the elastomers include rubbers, including vulcanized rubbers such as chemically cross-linked natural rubber or synthetic rubber, isoprene rubber, butadiene rubber, styrene-butadiene rubber, chloroprene rubber, nitrile rubber, polyisobutylene rubber, ethylene propylene rubber, chlorosulfonated polyethylene rubber, acrylic rubber, fluorine rubber, epichlorohydrin rubber, polyester rubber, urethane rubber, silicone rubber, and modified products thereof; and polymers such as polyacrylonitrile, polyethylene terephthalate, polybutylene terephthalate, polyvinyl chloride, polychlorotrifluoroethylene, polyethylene, polypropylene, polynorbornene, polyether ether ketone, polyphenylene sulfide, polyarylate, polycarbonate, polystyrene, epoxy resin, and oxazine resin, although not particularly limited thereto. Among these, preferred are natural rubber, isoprene rubber, butadiene rubber, styrene-butadiene rubber, chloroprene rubber, nitrile rubber, polyisobutylene rubber, ethylene propylene rubber, chlorosulfonated polyethylene rubber, acrylic rubber, fluorine rubber, epichlorohydrin rubber, polyester rubber, urethane rubber, silicone rubber, and modified products thereof, and more preferred are silicone rubber, acrylic rubber, and modified products thereof from the viewpoints of excellent heat resistance, excellent cold resistance, and the like.

It is to be noted that the base parts 22 can be composed of a two-color molded body or a multi-color molded body made of two or more polymer materials. In this case, forming the base parts 22 on a side in contact with the sheet 11 by using the same elastomer as that of the sheet 11 as described above facilitates integral molding of the sheet 11 and the base parts 22.

Note that, when providing the resonant portions 21 (the base parts 22) having a circular cross-sectional shape as in the present embodiment, among circles included in a cross section (a circular cross section) parallel to the sheet surface 11a of the sheet 11 at the height position of the resonant portions 21 (the base parts 22) where the total sum of cross-sectional areas of the plurality of resonant portions 21 (the base parts 22) is at a maximum, the diameter of a circle having a maximum diameter is preferably 100 mm or less, more preferably 50 mm or less, and still more preferably 20 mm or less. Additionally, the diameter of a circle having a minimum diameter thereamong is preferably 50 μm or more, more preferably 100 μm or more, and still more preferably 1 mm or more. By setting the diameters within the above preferable numerical ranges, a predetermined number or more of resonant portions 21 (base parts 22) can be arranged on the sheet surface 11a of the sheet 11, whereby higher sound-insulating performance can be obtained, and molding easiness and productivity also tend to be further improved.

Weight Part

The weight parts 23 are not particularly limited as long as they have a larger mass than the above-described base parts 22. In the present embodiment, the weight parts 23 are formed into a substantially cylindrical shape whose maximum diameter is smaller than the base parts 22, and are embedded in the base parts 22 on leading end sides of the resonant portions 21. Thus, employing the structure in which the weight parts 23 working as the weights of the resonators are supported by the base parts 22 determining the spring constant can facilitate, for example, adjustment of the spring constant by changing the shape or material (Young's modulus and mass) of the base parts 22 and control of the resonance frequency of the resonant portions 21 by changing the mass of the weight parts 23. In general, when the Young's modulus of the base parts 22 becomes small, the acoustic band gap tends to shift to a low frequency side. Additionally, when the mass of the weight parts 23 becomes large, the acoustic band gap tends to shift to a low frequency side.

The material forming the weight parts 23 can be selected as appropriate in consideration of mass, cost, and the like, and the kind of the material is not particularly limited. From the viewpoints of downsizing, improvement of sound-insulating performance, and the like of the sound insulating sheet member 100 and the sound insulating structural body 200, the material forming the weight parts 23 is preferably a material having high specific gravity. Specific examples of the material include metals such as aluminum, stainless steel, iron, tungsten, gold, silver, copper, lead, zinc, and brass or alloys thereof; inorganic glasses such as soda glass, quartz glass, and lead glass; and composites including powders of these metals or alloys thereof, these inorganic glasses, or the like in the polymer materials of the base parts 22 described above, although not particularly limited thereto. It is sufficient that the material, mass, and specific gravity of the weight parts 23 is determined such that the acoustic band gap between the sound insulating sheet member 100 and the sound insulating structural body 200 is coincident with a desired sound insulation frequency range. Among them, preferred is at least one selected from a group consisting of metals, alloys, and inorganic glasses from the viewpoints of low cost, high specific gravity, and the like. Note that the specific gravity means the ratio of the mass of the material to the mass of pure water at 4° C. under a pressure of 1013.25 hPa in a volume equal to the mass of the material, and the present specification uses values measured by JIS K 0061 "Test methods for density and relative density of chemical products".

In the present embodiment, the weight parts 23 are embedded in the base parts 22 on the leading end sides of the resonant portions 21, but the arrangement positions thereof are not particularly limited thereto. Although the arrangement positions vary depending on the shape, mass, Young's modulus, and the like of the base parts 22 and the weight parts 23, the base parts 22 and the weight parts 23 are preferably arranged such that the center of gravity (the center of mass) of the resonant portions 21 is located on the leading end sides thereof rather than at least the center in the height direction of the resonant portions 21, from the viewpoints of thickness reduction, weight reduction, or improvement of sound-insulating performance of the sound insulating sheet member. Typically, the weight parts 23 may be offset on the leading end sides rather than the center in the height direction of the resonant portions 21. Note that each weight part 23 may be completely embedded in the base part 22, only a part of the weight part 23 may be embedded therein, or may be provided on the base part 22 without being embedded therein. Additionally, in the case of the base part 22 having a branched structure, when providing the weight part at a branch part formed from a branched point, the weight part 23 is preferably arranged so as to be located on a leading end side of the branch part rather than the center thereof, from the viewpoint of weight reduction or improvement of sound-insulating performance of the sound insulating sheet member.

Note that although the plurality of resonant portions 21 are provided on the sheet surface 11a of the sheet 11, the material forming the resonant portions 21, the array, shape, size, arrangement direction, and the like of the resonant portions 21 do not necessarily have to be the same in all of the plurality of resonant portions 21. By making at least one of the resonant portions 21 different in kind so that a plurality of kinds of the resonant portions 21 are arranged, it is possible to enlarge a frequency region in which high sound-insulating performance appears.

Rib-Like Projecting Portions

The sound insulating sheet member of the present invention may include rib-like projecting portions 31. In the present embodiment, the rib-like projecting portions 31 are each molded into a substantially plate-like outer shape in such a manner as to extend in the length direction (a sheet flow direction: MD direction) of the sheet 11. The rib-like projecting portions 31 are each provided on the sheet surface 11a of the sheet 11, more specifically, at two edge portions in the width direction (a direction perpendicular to the sheet flow direction, that is, TD direction) of the sheet 11.

The rib-like projecting portions 31 have a maximum height H2, which is higher than the maximum height H1 of the resonant portions 21 described above, with respect to the normal direction of the sheet 11. Thus, even when the sound insulating sheet member 100 is wound into the form of a sheet or a plurality of the sound insulating sheet members 100 are stacked on each other, the resonant portions 21 are prevented from contacting with the back surface of the sheet 11 since the rib-like projecting portions 31 serve as spacers. Accordingly, providing the rib-like projecting portions 31 facilitates manufacturing and storage of the sound insulating sheet member 100 in the so-called roll-to-roll manner without causing manufacturing problems, such as deformation, variation, cracking, detachment, and breakage of the resonant portions 21. Note that, it is sufficient that the maximum height H2 of the rib-like projecting portions 31 is higher than the maximum height H1 of the resonant portions 21, and it is not particularly limited. From the viewpoints of molding easiness, productivity improvement, and the like, the maximum height H2 is preferably from 50 μm to 100 mm, more preferably from 100 μm to 50 mm, and still more preferably from 1 mm to 20 mm.

The shape and arrangement position of the rib-like projecting portions 31 are not particularly limited as long as they are arranged so as not to interfere with the resonant portions 21 working as the resonators. For example, the outer shape of the rib-like projecting portions 31 is not particularly limited, and any shape can be employed, such as any of polygonal prism-like shapes, such as a triangular prism-like shape, a rectangular prism-like shape, a trapezoidal prism-like shape, a pentagonal prism-like shape, and a hexagonal prism-like shape, cylindrical shapes, elliptic cylindrical shapes, truncated pyramid shapes, truncated cone shapes, pyramid shapes, cone shapes, hollow tubular shapes, and irregular shapes that are not classified into these shapes. The rib-like projecting portions 31 can also be formed into a columnar shape having a cross-sectional area and/or a cross-sectional shape varying depending on the height position of the rib-like projecting portions 31. In addition, it is sufficient that the maximum length of the rib-like projecting portions 31 in the length direction of the sheet 11 is not particularly limited as long as it is equal to or less than the maximum length in the MD direction of the sheet.

Note that although the present embodiment uses the pair of rib-like projecting portions 31 extending in the length direction of the sheet 11, a plurality of rib-like projecting portions 31 having a maximum length shorter than the pair thereof may be arranged apart along the length direction of the sheet 11. In this case, the arrangement interval between the respective rib-like projecting portions 31 may be periodic or at random. When arranging the plurality of rib-like projecting portions 31 apart from each other in this way, the distance between the respective rib-like projecting portions 31 is preferably 100 cm or less, more preferably 50 cm or less, and still more preferably 10 cm or less, although not particularly limited.

The material forming the rib-like projecting portions 31 is preferably the same polymer material as that of the sheet 11 and/or the base parts 22, and more preferably the same elastomer as that of the sheet 11 and/or the base parts 22, although not particularly limited. Employing the same polymer material as that of the sheet 11 and/or the base parts 22 facilitates integral molding thereof with the sheet 11 and/or the base parts 22, thereby significantly increasing productivity.

Support Body

The sound insulating sheet member of the present invention can be installed as appropriate according to an environment where sound-insulating performance is exhibited. For example, the sound insulating sheet member may be directly installed on a device, a structural body, or the like. An adhesion layer or the like may be provided between the sound insulating sheet member and the device, the structural body, or the like. Additionally, the sound insulating sheet member may be used in such a manner that the sound insulating sheet member is supported by a support body. When insulating sound by using the sound insulating sheet member of the present invention, it is sufficient that the support body supports the sound insulating sheet member, and the sound insulating sheet member does not have to be supported by the support body in situations such as being manufactured and stored.

It is sufficient that the support body is provided in contact with at least one surface of the sheet of the sound insulating sheet member. The support body may be provided on the sheet surface with which the resonant portions are provided in contact and/or a surface opposite to the sheet surface with which the resonant portions are provided in contact.

In the present embodiment, the support body 51 is provided on the back surface 11b side of the above sheet 11. The material forming the support body 51 is not particularly limited as long as it can support the sheet 11, but preferably one having a higher rigidity than the sheet 11 from the viewpoint of enhancement of sound-insulating performance. Specifically, the support body 51 preferably has a Young's modulus of 1 GPa or more, and more preferably 1.5 GPa or more. Although there is no particular upper limit, for example, the Young's modulus of the support body 51 may be 1000 GPa or less.

In addition, when directly installing the sound insulating sheet member on a device, a structural body, or the like, the surface where the sound insulating sheet member is to be installed preferably has the same rigidity as that of the above support body from the viewpoints of support of the sheet, enhancement of the sound-insulating performance, and the like.

Specific examples of the material forming the support body 51 include organic materials such as polyacrylonitrile, polyethylene terephthalate, polybutylene terephthalate, polyethylene naphthalate, polyvinyl chloride, polyvinylidene chloride, polychlorotrifluoroethylene, polyethylene, polypropylene, polystyrene, cyclic polyolefin, polynorbornene, polyether sulfone, polyether ether ketone, polyphenylene sulfide, polyarylate, polycarbonate, polyamide, polyimide, triacetyl cellulose, polystyrene, epoxy resins, acrylic resins, and oxazine resins, and composite materials including a metal such as aluminum, stainless steel, iron, copper, zinc, or brass, an inorganic glass, inorganic particles, or fiber in these organic materials, although not particularly limited thereto. Among them, from the viewpoints of sound-insulating properties, rigidity, moldability, cost, and the like, the support body is preferably at least one selected from a group consisting of photocurable resin sheets, thermosetting resin sheets, thermoplastic resin sheets, metal plates, and alloy plates. Herein, the thickness of the support body 51 is generally preferably from 0.1 mm to 50 mm from the viewpoints of sound insulating properties, rigidity, moldability, weight reduction, cost, and the like, although not particularly limited.

Note that the shape of the support body 51 can be set as appropriate according to the surface for installing the sound insulating structural body 200, and is not particularly limited. For example, the shape of the support body 51 may be a flat sheet shape, a curved sheet shape, or a special shape processed so as to have a curved surface part, a folded part, or the like. Furthermore, from the viewpoints of weight reduction and the like, a cutout portion, a punched-out portion, or the like may be provided at anyplace of the support body 51.

Second Embodiment

Figure 7:
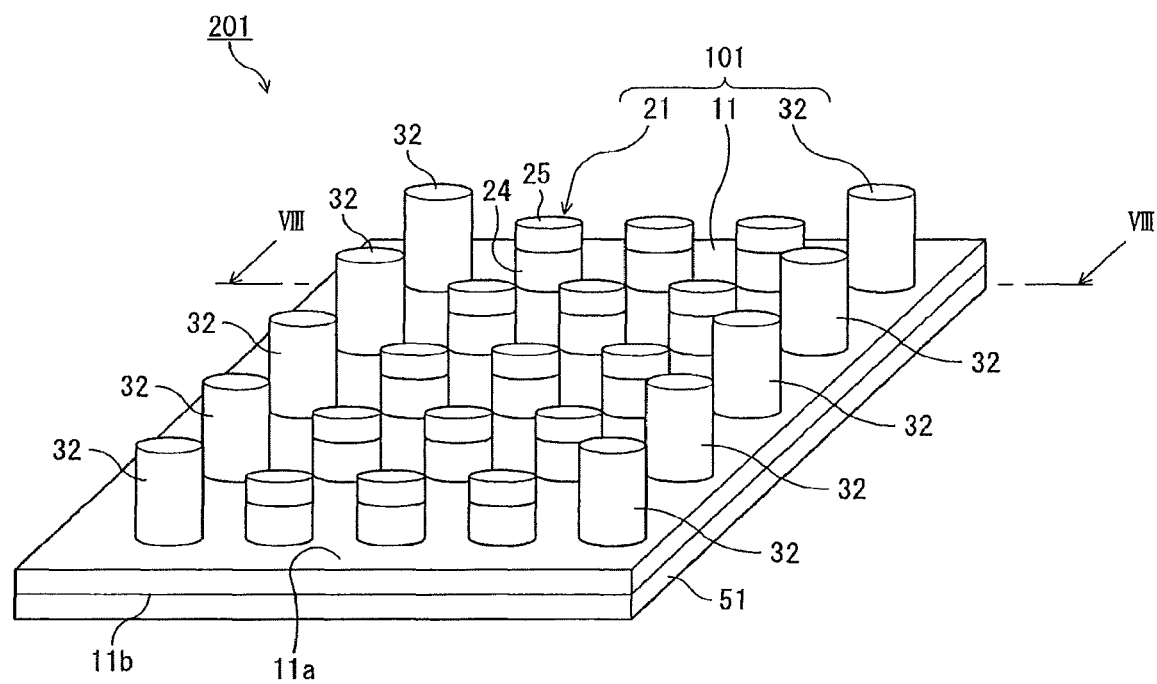
FIG. 7 is a schematic perspective view illustrating a sound insulating sheet member and a sound insulating structural body according to a second embodiment.
Figure 8:
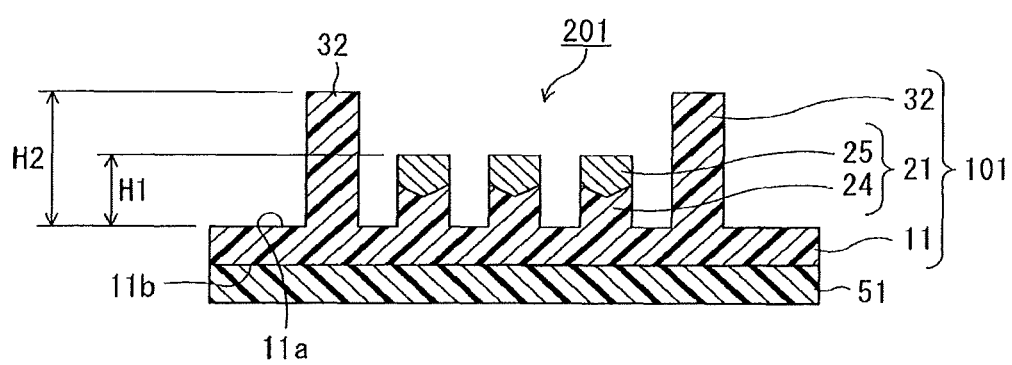
FIG. 8 is a cross-sectional view taken along arrows VIII-VIII of FIG. 7.

FIG. 7 and FIG. 8 are a schematic perspective view illustrating a sound insulating sheet member 101 and a sound insulating structural body 201 of the present embodiment and a cross-sectional view taken along arrows thereof. The present embodiment has the same structure as the sound insulating sheet member 100 and the sound insulating structural body 200 of the above-described first embodiment, except that the number of resonant portions arranged, the shapes of base parts and weight parts, and the shape and number of rib-like projecting portions arranged are different. Thus, redundant description thereof will be omitted here.

Each of the resonant portions 21 of the present embodiment is formed by a composite structure including a base part 24 and a weight part 25 supported by the base part 24 and having a larger mass than the base part 24. Even in the present embodiment, a plurality of the base parts 24 having a substantially cylindrical outer shape are provided in contact with the sheet surface 11a of the sheet 11.

Figure 9:
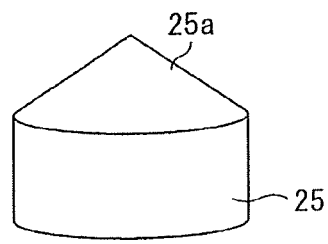
FIG. 9 is a schematic perspective view illustrating a weight part of the sound insulating sheet member and the sound insulating structural body of the second embodiment.
Figure 10:
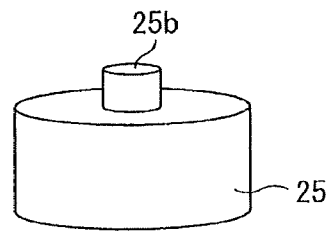
FIG. 10 is a schematic perspective view illustrating a weight part as a modified example.
Figure 11:
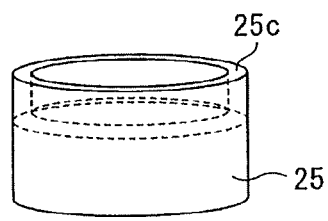
FIG. 11 is a schematic perspective view illustrating a weight part as a modified example.
Figure 12:
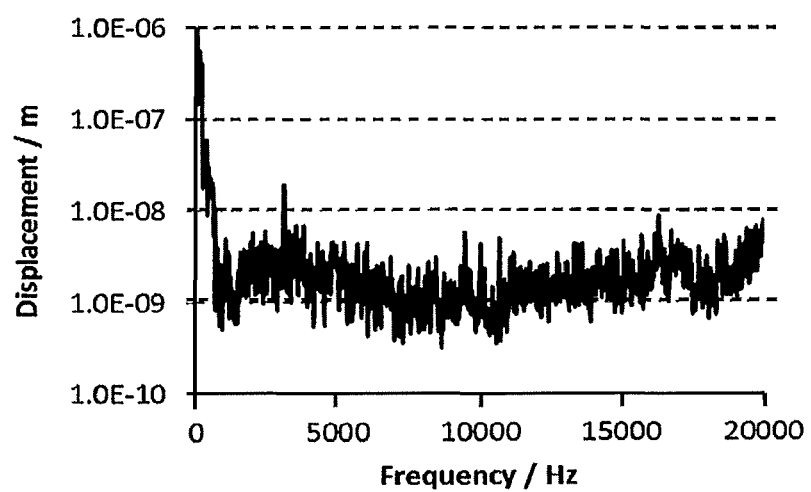
FIG. 12 is a graph illustrating the sound insulating performance of Example 1.
Figure 13:
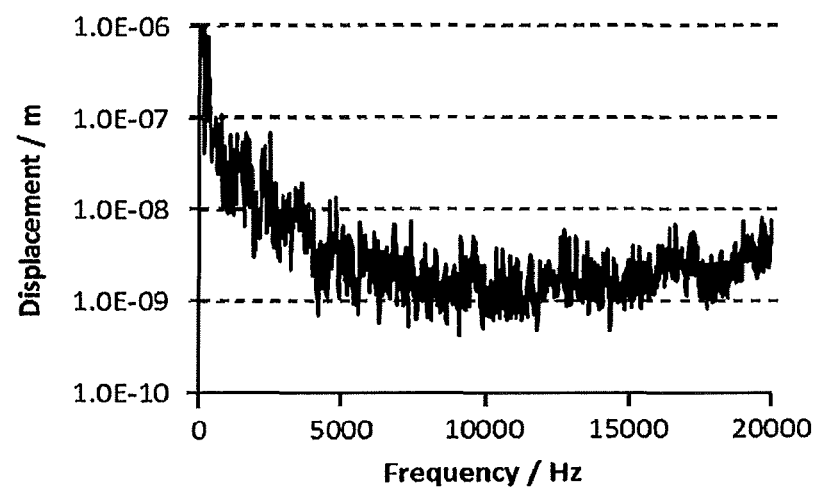
FIG. 13 is a graph illustrating the sound insulating performance of Comparative Example 1.
Figure 14:
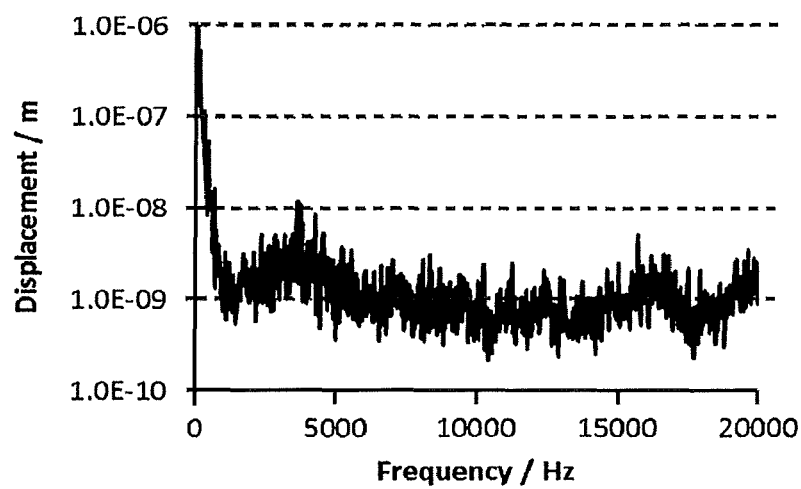
FIG. 14 is a graph illustrating the sound insulating performance of Comparative Example 2.
Figure 15:
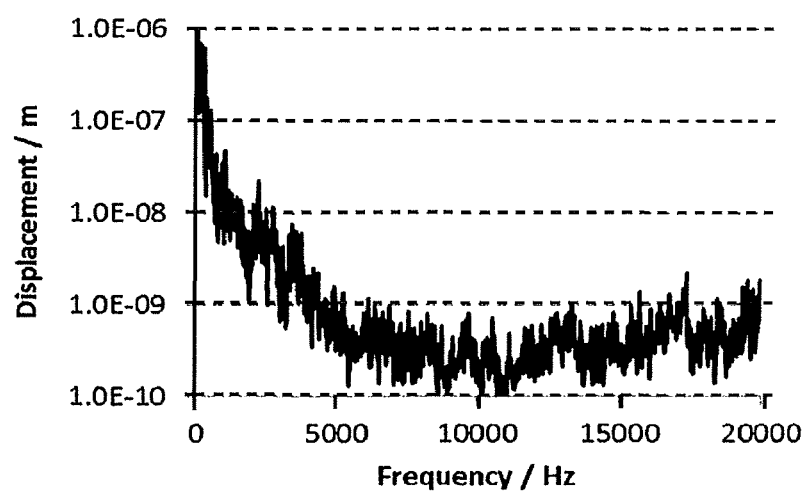
FIG. 15 is a graph illustrating the sound insulating performance of Comparative Example 3.
Figure 16:
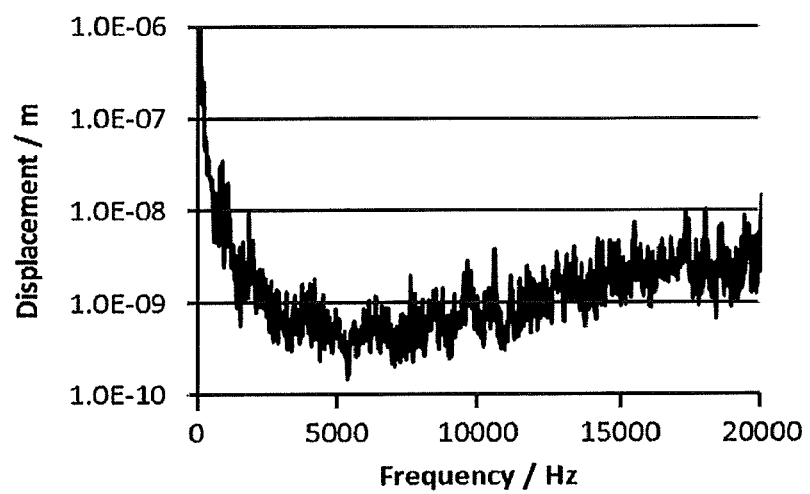
FIG. 16 is a graph illustrating the sound insulating performance of Comparative Example 4.
Figure 17:
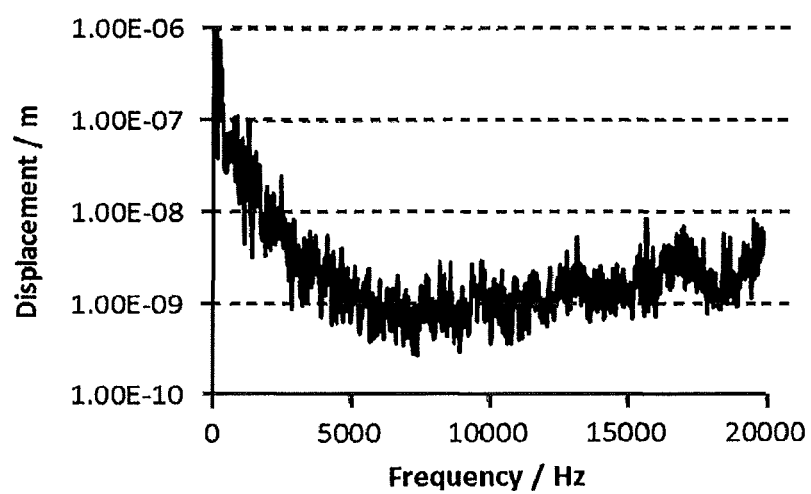
FIG. 17 is a graph illustrating the sound insulating performance of Comparative Example 5.

As illustrated in FIG. 9, each weight part 25 includes a protruding part 25a having a substantially conical shape provided toward the base part 24. The weight part 25 is supported on an upper surface side of the base part 24 in a state where the protruding part 25a is embedded in the base part 24. Even in this structure, detachment of the weight part 25 is prevented. Note that the shape of the protruding part 25a is not particularly limited as long as it is provided toward the base part 24. For example, as illustrated in FIG. 10 and FIG. 11, a protruding part 25b having a cylindrical shape or a protruding part 25c having a hollow tubular shape may be provided. Other than these, for example, any shape can be employed such as any of spherical shapes, semi-spherical shapes, elliptic spherical shapes, polygonal prism-like shapes such as a triangular prism-like shape, a rectangular prism-like shape, a trapezoidal prism-like shape, a pentagonal prism-like shape, and a hexagonal prism-like shape, elliptic cylindrical shapes, truncated pyramid shapes, truncated conical shapes, pyramid shapes, and irregular shapes that are not classified into these shapes.

On the other hand, rib-like projecting portions 32 of the present embodiment are formed by being molded into a substantially cylindrical outer shape, and arranged apart so as to each form a line along the length direction (the sheet flow direction: MD direction) of the sheet 11 at edge portions in the width direction (the direction perpendicular to the sheet flow direction, that is, TD direction) of the sheet 11.

Even in the present embodiment, the same functions and effects as those of the above-described first embodiment are achieved. In addition to them, followability (flexibility) of the sound insulating sheet member 101 is further increased since the plurality of rib-like projecting portions 32 are arranged apart so as to form the line in the present embodiment. Thus, even if an attachment surface has a more intricate shape, the flexible sheet 11, which is stretchable, can follow the surface shape, as a result of which the sheet 11 can be stably attached onto the support body 51.

Third Embodiment

Figure 19:
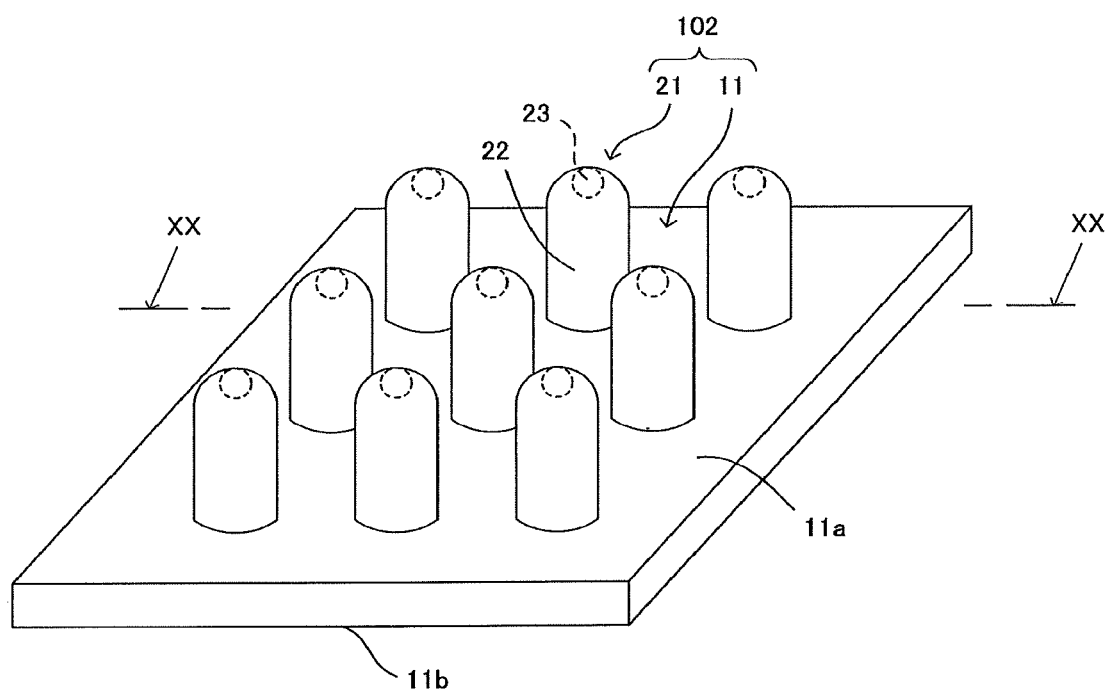
FIG. 19 is a schematic perspective view illustrating a sound insulating sheet member and a sound insulating structural body according to a third embodiment.
Figure 20:
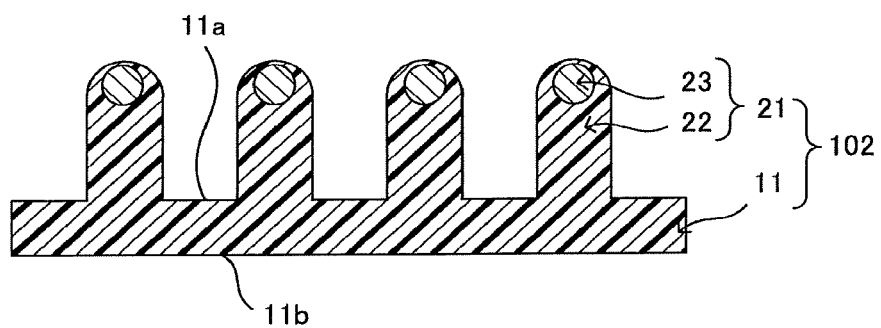
FIG. 20 is a cross-sectional view taken along arrows XX-XX of FIG. 19.

FIG. 19 is a schematic perspective view illustrating a sound insulating sheet member 102 of the present embodiment, and FIG. 20 is a cross-sectional view taken along arrows XX-XX thereof. The sound insulating sheet member 102 includes the sheet 11 having rubber elasticity and the plurality of resonant portions 21 provided on the sheet surface 11a of the sheet 11. The present embodiment has the same structures as the sound insulating sheet member 100 or 101 and the sound insulating structural body 200 or 201 of the first and second embodiments described above, except for the number of the resonant portions arranged, the shapes of the base parts and the weight parts, and the absence of rib-like projecting portions and a support body. Thus, redundant description thereof will be omitted here.

In the present embodiment, each base part 22 is substantially cylindrical, and a part of the base part 22 on a side opposite to a bottom surface in contact with the sheet surface 11a has a semi-spherical outer shape. The outer shape of the base part is not particularly limited, and the shape of the part thereof on the side opposite to the bottom surface in contact with the sheet surface 11a is also not particularly limited. The outer shape of the base part can be adjusted, as appropriate, into a shape, for example, such as a semi-spherical shape, a flat surface shape, a protruding shape, or a recessed shape.

The outer shape of the weight part is also not particularly limited, and can be adjusted, as appropriate, into a shape such as a spherical shape, a semi-spherical shape, a polyhedron such as a cube or a rectangular parallelepiped, or a plate-like shape.

Manufacturing Method

The method for manufacturing the sound insulating sheet member and the sound insulating structural body of the present invention are not particularly limited, and for example, may include the following steps (1) to (4):

(1) a step of preparing a mold provided with a plurality of cavities and arranging a weight in each of the plurality of cavities provided in the mold;

(2) a step of pouring a resin material and/or polymer material in the cavities;

(3) a step of curing the poured resin material and/or polymer material: and (4) a step of releasing the resulting cured article from the mold.

The above steps (1) to (4) can be performed in accordance with description of the manufacturing methods given in embodiments that will be described later.

In the step (2), the shape of the cavities is not particularly limited, but for example, the shape of the bottoms can be selected as appropriate, such as a semi-spherical shape, a flat surface shape, a protruding shape, or a recessed shape. For example, when the shape of the cavities is semi-spherical, the position of the weight arranged in the cavities is easily set at a top point of the semi-spherical shape, so that the position of the weight part in each of the plurality of resonant portions provided on the sound insulating sheet member tends to be easily constant.

Using the above-described first embodiment, one embodiment of the method for manufacturing the sound insulating sheet member will be given. The method for manufacturing the sound insulating sheet member and the sound insulating structural body of the present invention are not limited thereto. Additionally, the embodiment can also be applied correspondingly to other embodiments, as appropriate.

The sound insulating sheet member 100 can be obtained by providing the above-described resonant portions 21 and rib-like projecting portions 31 on the sheet surface 11a of the sheet 11. The method for arranging the resonant portions 21 and the rib-like projecting portions 31 is not particularly limited. Examples of the method include a method of thermally pressurizing or pressurizing separately molded respective parts to pressure-bond, a method of adhering by using any of various well-known adhesives, and methods of bonding by heat welding, ultrasonic welding, laser welding, or the like. Examples of the adhesives include epoxy resin-based adhesives, acrylic resin-based adhesives, polyurethane resin-based adhesives, silicone resin-based adhesives, polyolefin resin-based adhesives, polyvinyl butyral resin-based adhesives, and mixtures thereof, although not particularly limited thereto. Note that a part or the entire part of each resonant portion 21, and the rib-like projecting portions 31 can also be formed by punching out a rubber plate obtained by the above-described molding method. Additionally, when a part of each resonant portion 21 is composed of a metal or alloy, the part thereof can be formed by cutting out or the like of the metal or alloy.

From the viewpoints of improvements in productivity and economic efficiency and the like, preferred is a method of integrally molding the sound insulating sheet member 100 by die molding, cast molding, or the like. One example thereof is a method of molding an integrally molded article of the sheet 11, the resonant portions 21, and the rib-like projecting portions 31 by using a mold or a cast provided with cavities having a shape corresponding to the integrally molded article of the sheet 11, the resonant portions 21, and the rib-like projecting portions 31. As such an integrally molding method, various kinds of methods are known, such as press molding, compression molding, cast molding, extrusion molding, and injection molding, and the kind of the integrally molding method is not particularly limited. Note that when the raw material of each component is, for example, a resin material or a polymer material having rubber elasticity, it can be poured in the form of a liquid precursor or thermally molten material into the cavities. Alternatively, when the raw material is a metal, an alloy, or an inorganic glass, it can be previously arranged (inserted) in a predetermined position in the cavities.

The resin material and the polymer material are not particularly limited. Examples thereof include materials exemplified for the sheet, which uses the sound insulating sheet member of the present invention, the base parts, and the like, and raw materials, intermediate products, and the like thereof.

FIG. 3 to FIG. 6 are diagrams illustrating one example of the steps of manufacturing the sound insulating sheet member 100. Herein, using a mold 61 with cavities 61a having a shape corresponding to the resonant portions 21 and cavities 61b having a shape corresponding to the rib-like projecting portions 31 described above (see FIG. 3), the weight part 23 is arranged in each cavity 61a of the mold 61 (see FIG. 4). After that, a resin material having rubber elasticity is poured into the cavities 61a and 61b, and heating or pressurization is performed as needed (see FIG. 5). Then, the integrally molded article of the sheet 11, the resonant portions 21, and the rib-like projecting portions 31 is released from the mold to obtain the sound insulating sheet member 100. Such an integrally molding method can improve productivity and economic efficiency, as well as can facilitate molding for even an intricate shape, and the obtained sound insulating sheet member 100 tends to be excellent in mechanical strength due to enhanced adhesion strength between the respective components. From these viewpoints also, the sheet 11, the resonant portions 21, and the rib-like projecting portions 31 are preferably an integrally molded article including a thermosetting elastomer and/or thermoplastic elastomer.

Functions and Effects

The sound insulating sheet members 100 to 103 and the sound insulating structural bodies 200 to 201 of the present embodiment are configured such that the plurality of resonant portions 21 are provided in contact with the sheet surface 11a of the sheet 11 having rubber elasticity. Thus, when a sound wave is input from a noise source, high sound-insulating performance exceeding the mass law can be obtained. Herein, in the sound insulating sheet members 100 to 103 and the sound insulating structural bodies 200 to 201 of the present embodiment, adjustment of the spring constant by changing of the shape or material (Young's modulus or mass) of the base parts 22 and control of the resonance frequency of the resonant portions 21 by changing of the mass of the weight parts 23 or the like can be easily performed. Moreover, the frequency band (the acoustic band gap width and the frequency position) can be controlled even by the material, thickness, and the like of the sheet 11. Accordingly, the sound insulating sheet members 100 to 103 and the sound insulating structural bodies 200 to 201 of the present embodiment are excellent in flexibility of sound insulation frequency selection and design flexibility as compared to the conventional ones.

Additionally, in the sound insulating sheet members 100 to 103 and the sound insulating structural bodies 200 to 201 of the present embodiment, the resonant portions 21 and the rib-like projecting portions 31 are provided in contact with the sheet surface 11a on one side of the sheet 11 having rubber elasticity, and not provided on the sheet surface 11b on the other side thereof. Thus, even when the support body 51 is a non-flat surface having, for example, a curved surface or the like, the flexible sheet 11, which is stretchable, can follow the surface shape thereof, as a result of which the sheet 11 can be stably attached onto the support body 51. Accordingly, the sound insulating sheet members 100 to 103 and the sound insulating structural bodies 200 to 201 of the present embodiment are excellent in handleability and versatility as compared to the conventional ones.

Additionally, when the sheet 11 and the resonant portions 21 are integrally molded, the plurality of resonant portions 21 (resonators) can be arranged at once, so that productivity and handleability can be significantly improved.

There are arranged the rib-like projecting portions 31 having the maximum height H2 higher than the maximum height H1 of the resonant portions 21. Thus, even when each of the sound insulating sheet members 100 to 103 is wound into the form of a sheet or a plurality of the respective sheet members re stacked on each other, the rib-like projecting portions 31 serve as spacers to prevent the resonant portions 21 from contacting with the back surface of the sheet 11. Accordingly, without causing manufacturing problems such as deformation, modification, cracking, detachment, and breakage of the resonant portions 21, the sound insulating sheet members 100 to 103 can be easily continuously produced and stored in the so-called roll-to-roll manner, whereby productivity speed is improved as compared to sheet-by-sheet batch production, so that productivity and economic efficiency can be improved.

Sound Insulating Structural Body

The sound insulating sheet member of the present invention can be used as a sound insulating structural body. As described in the above embodiments, the sound insulating structural body may include a support body, rib-like projecting portions, and the like.

Additionally, as one example of a method for using the sound insulating sheet member of the present invention, it can be considered that the sheet member is used to reduce or eliminate sounds generated from machinery or equipment, such as a motor and a pump, and sounds generated from metal pipes or resin pipes by attaching to the main body or the cover of the machinery or equipment or winding around the metal pipes, the resin pipes, or the like.

As the sound insulating structural body, the sound insulating sheet member of the present invention may be a sound insulating structural body including the sound insulating sheet member and a flame retardant and/or nonflammable member. Using the sheet member in combination with a flame retardant and/or nonflammable member enables the sheet member to be used as a structural body for architecture or the like having a sound insulating function and a fire protecting function. The configurations, positions, and the like of the sound insulating sheet member and the flame retardant and/or nonflammable member forming the sound insulating structural body are not particularly limited. For example, the flame retardant and/or nonflammable member may be used as a support body to provide the sound insulating sheet member on the support body, or the sound insulating sheet member may be provided in a case composed of the flame retardant and/or nonflammable member.

The flame retardant and/or nonflammable case is a member that is cured by heating and not melted even by high temperature heat in case of fire or a member that keeps a certain shape without being flammable for a certain length of time even when fire heat is applied, and that is formed by a thermosetting resin composition or a flame retardant material (including quasi-nonflammable materials and nonflammable materials).

The thermosetting resin composition is not particularly limited, and examples thereof include thermosetting acrylic resin compositions and thermosetting epoxy resin compositions, and polyimide-based resins, which have high heat resistance.

Examples of the flame retardant materials include inorganic fibers such as glass wool, rock wool, ceramic wool, siliceous fiber, carbon fiber, silica alumina fiber, alumina fiber, and silica fiber, products obtained by processing gypsum, concrete, or the like into planar shapes or products obtained by adding the above-mentioned inorganic fibers to gypsum, concrete, or the like and processing the mixtures into planar shapes, and flame retardant resin compositions obtained by adding a flame retardant such as red phosphorus to metals such as steel, iron, copper, and aluminum, an aluminum glass cloth, and a resin component such as urethane resin.

Figure 21:
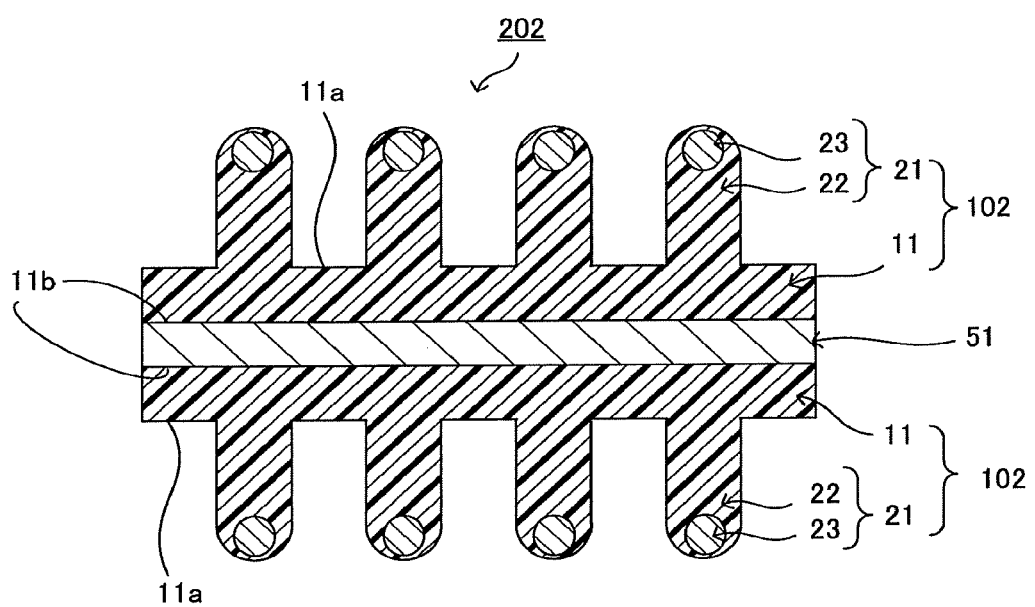
FIG. 21 is a diagram illustrating an example of the sound insulating structural body.

The sound insulating structural body may be a layered body including the sound insulating sheet member of the present invention. For example, as in the cross-sectional view of a sound insulating structural body illustrated in FIG. 21, the sound insulating structural body may be one formed by providing the sound insulating sheet member 102 on both surfaces of the support body 51, i.e., a sound insulating structural body formed by allowing the two sheet surfaces 11b of the sound insulating sheet member 102 to face each other to have the support body 51 therebetween. Alternatively, a plurality of sound insulating structural bodies each including the sound insulating sheet member provided on a support body may be stacked on each other for use. Combining the plurality of sound insulating sheet members enables control of the acoustic band gap width, the frequency position, and the like.

EXAMPLES

Hereinafter, the present invention will be described more specifically by way of Examples. However, the present invention is not limited thereby at all. The present invention can employ various conditions as long as the object of the invention is achieved without departing the scope of the invention.

Example 1

Sylgard 184 (Dow Corning Toray Co., Ltd.) was poured into a stainless-steel vessel and heated at 150° C. for 15 minutes to produce a silicone rubber sheet having a thickness of 3 mm. The Young's modulus of the produced silicone rubber was measured by a dynamic viscoelasticity analyzer DVA-200s (manufactured by IT Keisoku Seigyo Co., Ltd.) and found to be 10 MPa at 25° C. and 10 Hz. Additionally, the density thereof was 1.04 g/cm$^3$. After that, the silicone rubber sheet was punched out into a cylindrical shape having a diameter of 6 mm and a height of 3 mm to produce base parts of resonant protruding portions. The mass per base part of the resonant protruding portions was 0.09 g. In addition, tungsten having a density of 19.3 g/cm$^3$ was cut into a cylindrical shape having a diameter of 6 mm and a height of 3 mm to produce weight parts of the resonant protruding portions. The mass per weight part of the resonant protruding portions was 1.6 g.

The obtained cylindrical base parts were pressure-bonded onto a silicone rubber sheet (manufactured by Mitsubishi Plastics, Inc) having a thickness of 0.2 mm and a Young's modulus of 3.4 MPa (25° C. and 10 Hz). Next, the cylindrical weight parts were pressure-bonded onto an upper surface of the cylindrical base parts to produce a sound insulating sheet member of Example 1. Then, the obtained sound insulating sheet member was pressure-bonded and attached to an aluminum plate having a thickness of 0.5 mm to produce a sound insulating structural body of Example 1.

Comparative Examples 1 to 3

All of the resonant portions were removed from the sound insulating structural body of Example 1 to produce a sound insulating structural body of Comparative Example 1. Additionally, without using a silicone rubber sheet having a thickness of 0.2 mm, the base parts were directly pressure-bonded onto an aluminum plate having a thickness of 0.5 mm, and the cylindrical weight parts were adhered to the upper surfaces of the base parts to produce a sound insulating structural body of Comparative Example 2. Furthermore, the weight parts were adhered onto an aluminum plate having a thickness of 0.5 mm by ARON ALPHA 201 (manufactured by Toagosei Co., Ltd) to produce a sound insulating structural body of Comparative Example 3.

Comparative Examples 4 to 5

The cylindrical weight parts made of tungsten in Example 1 were pressure-bonded onto a silicone rubber sheet (manufactured by Mitsubishi Plastics, Inc.) having a thickness of 0.2 mm and a Young's modulus of 3.4 MPa (25 □C and 10 Hz) to produce a sound insulating sheet member. Then, the obtained sound insulating sheet member was pressure-bonded and attached to an aluminum plate having a thickness of 0.5 mm to produce a sound insulating structural body of Comparative Example 4.

Additionally, the cylindrical base parts made of the silicone rubber in Example 1 were pressure-bonded onto a silicone rubber sheet (manufactured by Mitsubishi Plastics, Inc.) having a thickness of 0.2 mm and a Young's modulus of 3.4 MPa (25 □C and 10 Hz) to produce a sound insulating sheet member. Then, the obtained sound insulating sheet member was pressure-bonded and attached to an aluminum plate having a thickness of 0.5 mm to produce a sound insulating structural body of Comparative Example 5.

Note that the sound insulating structural bodies of Example 1 and Comparative Examples 1 to 5 had a plate shape having a size of 300 mm×200 mm in plan view. In addition, in each of the sound insulating structural bodies of Example 1 and Comparative Examples 2 to 5, 100 resonant protruding portions (a lattice-like array composed of 10 pieces in the sheet length direction×10 pieces in the sheet width direction) were provided in a 100×100 mm region of a sheet center portion.

Sound-Insulating Performance

The produced sound insulating structural bodies each were mounted to an opening portion (210 mm×300 mm) of an upper part of a sound source chamber having an internal size of 700 mm×600 mm×500 mm (volume: 0.21 m³), and vibration amplitude in the out-of-plane direction of the sheet surface where the resonant portions were not overlapping at a center portion of the sound insulating structural body was measured using a laser Doppler vibrometer (OFV2500, CLV700 (Polytec Co., Ltd.)). White noise was radiated from a speaker (101 MM (Bose Co., Ltd.) installed in the sound source chamber so that a sound wave was input to a test body from random directions. FIGS. 12 to 17 depict results of the measurement.

When compared between Example 1 and Comparative Example 1, it was confirmed that due to the presence of the resonant portions, a vibration suppressing region appeared near 1 to 2 kHz. Additionally, when compared between Example 1 and Comparative Example 2, it was confirmed that, in both of the structure of the conventional technique including the plurality of resonators directly adhered onto the aluminum plate and the structure of the present invention including the plurality of resonant portions provided on the sheet having rubber elasticity, a vibration reducing region similarly appeared near 1 to 2 kHz. This has proved that the present invention has a sound insulating performance equivalent to that of the conventional technique.

In addition, when compared between Example 1 and Comparative Example 3, it was confirmed that even though both structures were substantially equal in area density, the structure including the plurality of cylindrical weight parts directly adhered onto the aluminum plate had no appearance of vibration reduction near 1 to 2 kHz. This has proved that the sound insulating sheet member and the sound insulating structural body of the present invention exhibit behaviors that exceed mass law.

Furthermore, when compared between Example 1 and Comparative Example 4, it was confirmed that the structure without any cylindrical base parts did not have conspicuous vibration reduction near 1 to 2 kHz. This has proved that the resonant portions need to be provided with base parts.

In addition, when compared between Example 1 and Comparative Example 5, it was confirmed that the structure without any cylindrical weight parts had no appearance of vibration reduction near 1 to 2 kHz. This has proved that the resonant portions need to be provided with weight parts.

Acoustic Band Gap

Figure 18:
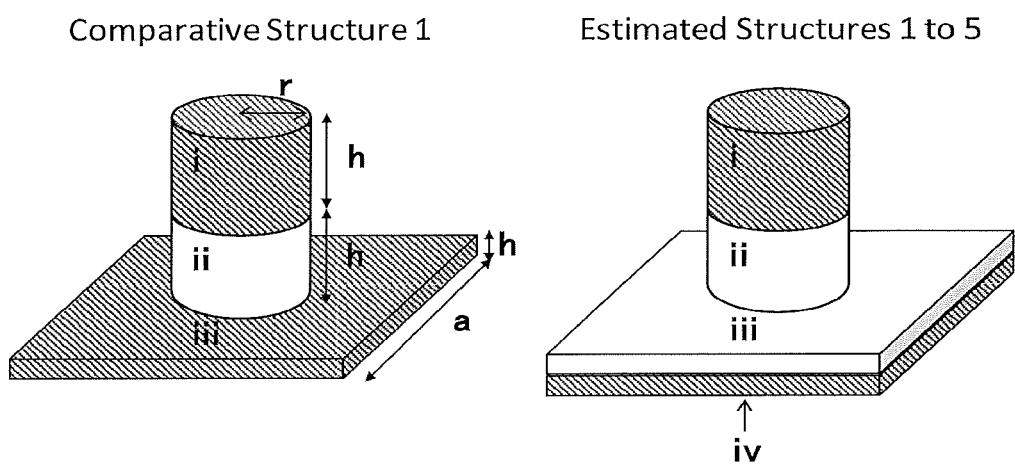
FIG. 18 is schematic structural view of unit cells used for estimation of acoustic band gap.

Next, acoustic band gap estimation was estimated by a finite element method by the method described in Non-Patent Literature 3. FIG. 18 illustrates schematic view of unit cells of each structure, and Table 1 depicts results of the acoustic band gap estimation, together with sizes, materials, and physical properties of constituent members.

TABLE 1

| | Part | r/mm | h/mm | a/mm | Material | Specific gravity g/cm3 | Young's modulus Mpa | Poisson coefficient | Acoustic band gap |
|---|---|---|---|---|---|---|---|---|---|
| Estimated Structure 1 | i | 3 | 3 | — | Iron | 7.85 | 211000 | 0.29 | 780-960 Hz |
| | ii | 3 | 3 | — | Rubber | 1.05 | 1 | 0.49 | |
| | iii | — | 0.2 | 10 | Rubber | 1.05 | 1 | 0.49 | |
| | iv | — | 0.5 | 10 | Aluminum | 2.7 | 63300 | 0.36 | |
| Estimated Structure 2 | i | 3 | 3 | — | Iron | 7.85 | 211000 | 0.29 | 755-910 Hz |
| | ii | 3 | 3 | — | Rubber | 1.05 | 1 | 0.49 | |
| | iii | — | 0.5 | 10 | Rubber | 1.05 | 1 | 0.49 | |
| | iv | — | 0.5 | 10 | Aluminum | 2.7 | 63300 | 0.36 | |
| Estimated Structure 3 | i | 3 | 3 | — | Iron | 7.85 | 211000 | 0.29 | 755-1000 Hz |
| | ii | 3 | 3 | — | Rubber | 1.05 | 1 | 0.49 | |
| | iii | — | 0.5 | 10 | Rubber | 1.05 | 1 | 0.49 | |
| | iv | — | 0.5 | 10 | Polycarbonate | 1.2 | 2300 | 0.39 | |
| Estimated Structure 4 | i | 3 | 3 | — | Iron | 7.85 | 211000 | 0.29 | 2390-2880 Hz |
| | ii | 3 | 3 | — | Rubber | 1.05 | 10 | 0.49 | |
| | iii | — | 0.5 | 10 | Rubber | 1.05 | 10 | 0.49 | |
| | iv | — | 0.5 | 10 | Aluminum | 2.7 | 63300 | 0.36 | |
| Estimated Structure 5 | i | 3 | 3 | — | Iron | 7.85 | 211000 | 0.29 | 1890-2190 Hz |
| | ii | 3 | 3 | — | Rubber | 1.05 | 10 | 0.49 | |
| | iii | — | 0.5 | 10 | Rubber | 1.05 | 1 | 0.49 | |
| | iv | — | 0.5 | 10 | Aluminum | 2.7 | 63300 | 0.36 | |
| Comparative Structure 1 | i | 3 | 3 | — | Iron | 7.85 | 211000 | 0.29 | 800-1000 Hz |
| | ii | 3 | 3 | — | Rubber | 1.05 | 1 | 0.49 | |
| | iii | — | 0.5 | 10 | Aluminum | 2.7 | 63300 | 0.36 | |

When compared between Estimated Structures 1 and 2 and Comparative Structure 1, the acoustic band gap of the sound insulating sheet member including the plurality of resonant portions provided on the sheet having rubber elasticity has shifted to a low frequency side as the thickness of the sheet has increased from 0.2 mmt to 0.5 mmt. The above result confirmed that the acoustic band gap can be controlled by the thickness of the sheet, and thus design flexibility of the sound insulating sheet member is increased.

Furthermore, Estimated Structures 4 and 5 indicate that reducing the Young's modulus of the sheet from 10 MPa to 1 MPa has caused the acoustic band gap to shift to a low frequency side. The above result confirmed that the acoustic band gap can be controlled by the Young's modulus of the sheet, and thus design flexibility of the sound insulating sheet member is increased.

REFERENCE SIGNS LIST

11: Sheet
11a: Sheet surface
11b: Sheet surface
21: Resonant portion
22: Base part
23: Weight part
24: Base part
25: Weight part
25a: Protruding part
25b: Protruding part
25c: Protruding part
31: Rib-like projecting portion
32: Rib-like projecting portion
51: Support body
61: Mold
61a: Cavity
61b: Cavity
100: Sound insulating sheet member
101: Sound insulating sheet member
102: Sound insulating sheet member
200: Sound insulating structural body
201: Sound insulating structural body
202: Sound insulating structural body
H1: Maximum height
H2: Maximum height
r: Radius
h: Height
a: Sheet length
i: Weight part
ii: Base part
iii: Sheet
iv: Support body

The invention claimed is:

1. A sound insulating sheet member comprising at least a sheet having rubber elasticity and a plurality of resonant portions,
Wherein the resonant portions are provided in contact with a sheet surface of the sheet, each of the resonant portions including a base part and a weight part, and the weight part being supported by the base part and having a larger mass than the base part,
Wherein each resonant portion comprises a single weight part, wherein each resonant portion is individually provided with the single weight part, and
Wherein at least a part of the weight part is embedded in the base part on a leading end side of the resonant portion.

2. The sound insulating sheet member according to claim 1, wherein the sheet includes at least one selected from a group consisting of thermosetting or photocurable elastomers and thermoplastic elastomers.

3. The sound insulating sheet member according to claim 1, wherein the sheet has a Young's modulus of from 0.01 MPa to 100 MPa.

4. The sound insulating sheet manner according to claim 1, wherein the base part includes at least one selected from a group consisting of thermosetting or photocurable elastomers, thermoplastic elastomers, thermosetting or photocurable resins, and thermoplastic resins.

5. The sound insulating sheet member according to claim 1, wherein the sheet and the resonant: portions are an integrally molded article, and both together include at least one selected from the group consisting of thermosetting or photocurable elastomers and thermoplastic elastomers.

6. The sound insulating sheet member according to claim 1, wherein the weight part includes at least one selected from a group consisting; of metals, alloys, and inorganic glasses.

7. The sound insulating sheet member according to claim 1, wherein a center of gravity of the resonant portions is located on the leading end sides thereof rather than at least the center in the height direction of the resonant portions.

8. The sound insulating sheet member according to claim 1, wherein the weight part includes a protruding part provided toward the base part.

9. The sound insulating sheet member according to claim 1, further comprising at least one more rib-like projecting portions, wherein the rib-like projecting portions are provided in contact with the sheet surface of the sheet, and have a height higher than the resonant portions in a sheet normal direction.

10. The sound insulating sheet member according to claim 9, wherein the rib-like projecting portions are provided so as to extend in a sheet length direction of the sheet.

11. The sound insulating sheet member according to claim 9, wherein a plurality of the rib-like projecting portions are spaced apart along the sheet length direction of the sheet.

12. The sound insulating sheet member according to claim 9, wherein the sheet, the resonant portions, and the rib-like projecting portions are an integrally molded article, and all together include at least one selected from the group consisting of thermosetting or photocurable elastomers and thermoplastic elastomers.

13. A sound insulating structural body comprising at least the sound insulating sheet member according to claim 1 and a support body, wherein the support body is provided in contact with at least one surface of the sheet of the sound insulating sheet member, and supports the sheet.

14. The sound insulating structural body according to claim 13, wherein the support body has a Young's modulus of 1 GPa or more.

15. A sound insulating structural body comprising the sound insulating sheet member according to claim 1 and a flame retardant and/or nonflammable member.

16. A sound insulating structural body that is a layered body comprising the sound insulating sheet member according to claim 1.

17. A method for manufacturing a sound insulating sheet member, comprising the following steps of:
1) preparing a mold provided with a plurality of cavities and arranging an individual weight in each of the plurality of cavities provided in the mold;
2) pouring a resin material and/or polymer material in the cavities;
3) curing the poured resin material and/or polymer material; and
4) releasing the resulting cured article from the mold.

18. The method for manufacturing a sound insulating sheet member according to claim 17, wherein bottoms of the cavities are hemispherical.

* * * * *